SINGLE SIDEBAND TRANSCEIVER SYSTEM

Filed Nov. 5, 1963 3 Sheets-Sheet 1

INVENTOR.
VIKTOR J. POKORNY
BY
Fehr & Swain
ATTORNEYS

SINGLE SIDEBAND TRANSCEIVER SYSTEM

Filed Nov. 5, 1963

INVENTOR.
VIKTOR J. POKORNY
BY
Fleko & Swain
ATTORNEYS

July 18, 1967 V. J. POKORNY 3,332,016

SINGLE SIDEBAND TRANSCEIVER SYSTEM

Filed Nov. 5, 1963 3 Sheets-Sheet 3

INVENTOR.
VIKTOR J. POKORNY
BY
Fishe & Swain
ATTORNEYS 3,332,016
SINGLE SIDEBAND TRANSCEIVER SYSTEM
Viktor J. Pokorny, Guatemala City, Guatemala
(5a Calle Oriente 14, Antigua, Guatemala)
Filed Nov. 5, 1963, Ser. No. 321,478
9 Claims. (Cl. 325—18)

This invention relates to an improved, two-way single sideband communications system, commonly referred to as a transceiver. More particularly, the invention pertains to such a system wherein the transmitting and receiving sections share a number of components common to each.

Separate circuits are commonly used for the transmitter and the receiver sections of a two-way single sideband communications system. A circuit consolidation is generally limited to signal rerouting in which the shared stages process signals of the same frequency for both receiving and transmitting modes of operation. Such circuit consolidation is used, for example, to utilize only one mechanical filter in the set or to use only one set of frequency determining selective circuits for both the transmitter and the receiver, but beyond such limited objectives no further attempts are made at circuit consolidation.

It is, therefore, a general object of this invention to provide a fuller consolidation of the transmitter circuits into the receiver circuits of a two-way single sideband communications system.

A further object of the invention is to provide the desired circuit consolidation in such a way that a minimum amount of signal rerouting and of switching results.

In the past, where certain circuit consolidation has been attempted, the approach has been to apply switching in the direct path of the signals being transceived. This technique has led to a number of problems which are well known. According to the present invention, however, a number of stages having a dual capability are employed wherein switching in the direct path of the signal is unnecessary thereby permitting switching to be limited to the local oscillators.

By employing the novel system of local oscillator switching, it is possible to construct a consolidated transceiver circuit wherein the frequency converters of the transceiver are of dual capability and are shared by the transmitter and the receiver sections. This arrangement leads to a further logical grouping of common stages including a common intermediate frequency amplifier and common dual capability input and output circuits of the transceiver, so that the sequence of common stages and the direction of signal flow through them remains the same for transmitting and receiving functions, while the total absence of signal rerouting among the stages results in a circuit of extreme simplicity.

It is an advantage of the novel oscillator switching method, that the common frequency converters and other common circuits of dual capability are operating at two widely separated frequencies for the receiving and transmitting functions and under such conditions the design of circuits capable of operating at two frequencies is greatly simplified. The design is further simplified by the fact that the two signals are not processed concurrently, but that the received and transmitted signals pass through the dual capability circuits during separate time intervals.

It is a further object of the invention to provide in a transceiver, an economy in the number of active stages utilized thus increasing economy of construction and reliability of operation.

These and other objects of the invention will be more readily apparent from the following description of a preferred embodiment when taken in conjunction with the drawings in which.

As is known, a superheterodyne transmitter construction can include, in the following order, a microphone which feeds an audio amplifier followed by a first frequency conversion means or mixer wherein a low frequency oscillator signal is combined with the audio signal and fed to an I.F. frequency amplifier and filter. The output of the I.F. amplifier feeds the amplified I.F. signal to a second frequency converter wherein a high frequency oscillator signal is combined with the I.F. signal to provide an R.F. signal which is in turn fed to an intermediate power amplifier and subsequently to a power amplifier serving the antenna.

As is further known, a heterodyne receiver can include stages, for example, starting with the receiver antenna, to include a radio frequency amplifier serving to amplify the R.F. signals received by the antenna. The R.F. amplifier feeds a first frequency conversion means, wherein the R.F. is converted to I.F. utilizing a high frequency local oscillator signal heterodyned with the incoming R.F. signal to provide an I.F. output. The I.F. output is fed through the I.F. amplifier and filter to a second frequency conversion means wherein a low frequency local oscillator signal is heterodyned with the I.F. signal to develop an audio signal, which is subsequently amplified and applied to a loud speaker.

In general, according to the present invention, there is provided in a transceiver system wherein information is transmitted and received, a sub-system serving to consolidate a number of the components described above. In general, the consolidation utilizes a first frequency conversion means having the dual capability of converting an audio frequency signal upwardly to an I.F. signal and for converting an R.F. signal downwardly to the I.F. signal. A second frequency conversion means is provided having the dual capability of converting an I.F. signal upwardly to an R.F. signal and for converting an I.F. signal downwardly to an audio signal. An I.F. signal amplifying means is disposed between the output of the first frequency conversion means and the input of said second frequency conversion means. A first and second local oscillator means are also provided together with switching means serving, during the transmitting mode of operation, to operatively couple the first oscillator means to the input of said first frequency conversion means and to operatively couple the input of the second local oscillator means to the second frequency conversion means, and serving, during a signal receiving mode of operation, to interchange the connections of the first and second local oscillator means.

Accordingly, the signals being fed through the transceiver for either of the two modes of operation pass through the various stages in a common direction.

It is considered that the detailed description of a transceiver according to the present invention, will be more easily understood by the following general explanation of the overall system.

Figure 1:
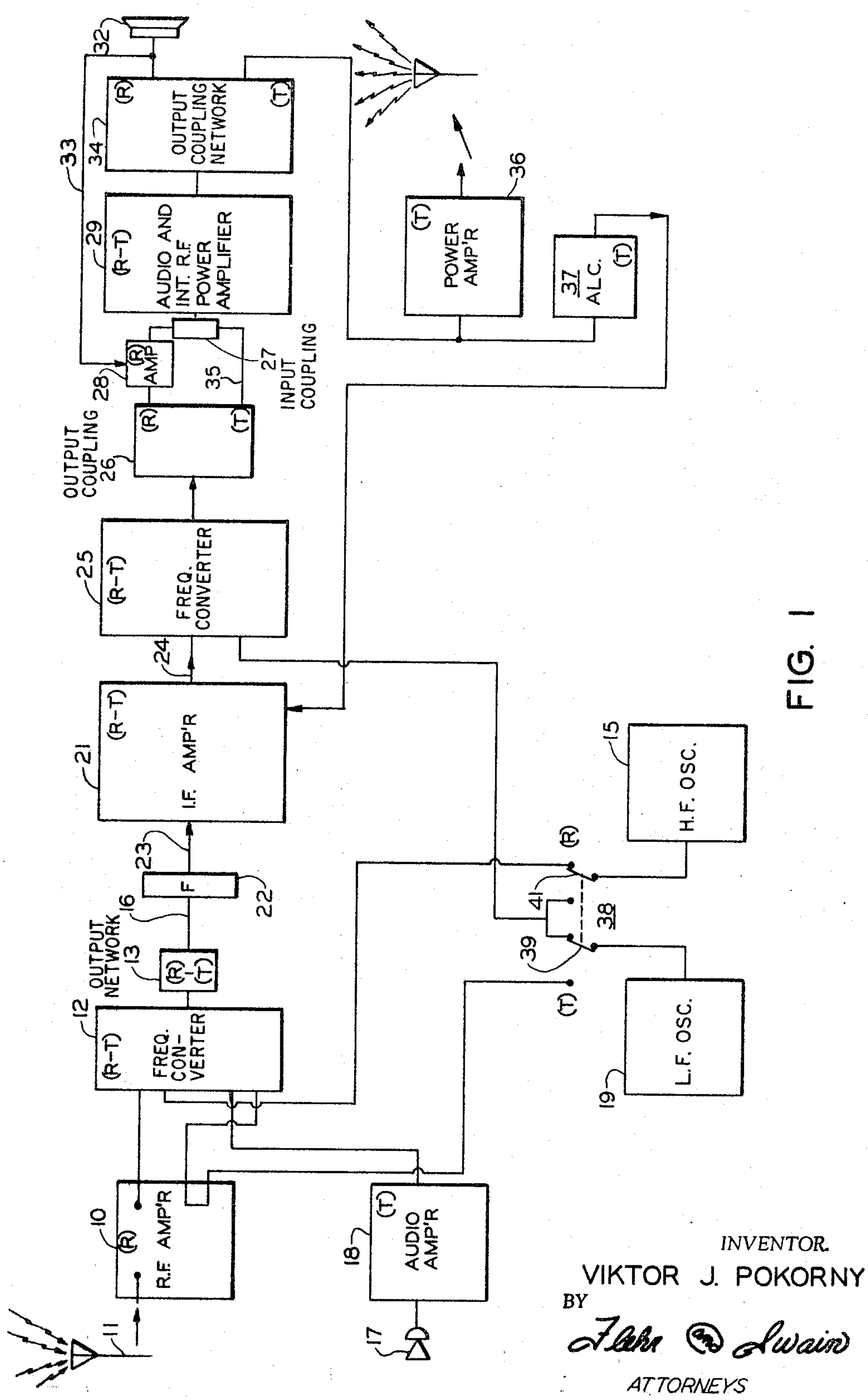
FIGURE 1 is a block diagram of a circuit according to the invention.

Therefore, referring to FIGURE 1, it is seen that to receive a signal, an R.F. amplifier 10 serves to amplify the R.F. signals received by the antenna 11 and apply them to the first frequency conversion means 12. Frequency conversion means 12 is arranged to serve a receiving and a transmitting mode of operation. As described further below, the frequency conversion means 12 can preferably be of a special design which includes a single active device with multiple inputs and with output network 13 tuned to the intermediate frequency. The input to stage 12 consists of high or low frequency local oscillator signals which are connected to stage 12 as described below and of an information signal. A single input may be provided for the information signal with a coupling input network provided so that it responds only to the two frequencies of the transmitted and received signals, or separate signal inputs may be provided to separate input terminals of the common active element in stage 12. Thus, a dual capability is provided in frequency conversion means 12, whereby in one mode a local oscillator signal from the high frequency oscillator 15 is mixed with an R.F. signal. The same frequency conversion means 12 serves, during the transmission mode of operation, to combine or mix an amplified audio signal, generated by microphone 17 and an audio amplifier 18, with a local oscillator signal from a low frequency oscillator 19 to provide output signal on line 16. Signal on line 16 is fed to an intermediate frequency amplifier 21 via a mechanical filter 22.

The input 23 and output 24 of the I.F. amplifier 21, accordingly, feed I.F. signals in the same direction through amplifier 21 for both the transmitting and receiving modes of operation. The I.F. output is then fed to a second frequency conversion means 25 which also has a dual capability.

Frequency conversion means 25 serves during the transmitting period to convert the incoming I.F. signal to radio frequency and during the receiving mode the same device, 25, serves to convert the I.F. signal to audio frequency, operating in this case as a product detector.

The output coupling network 26 of frequency conversion device 25 responds to the desired radio frequency and audio frequency and rejects all other signals. In addition, coupling network 26 separates radio frequency and audio frequency so that these signals can be fed conveniently to the following stage.

During reception, the audio signal is taken from the audio terminals of the coupling network 26 and is fed either directly to the proper terminals of the intermediate power amplifier input network 29, or, as is preferred, to an audio preamplifier stage 28.

During transmission the radio frequency signal is fed from the R.F. terminals of the coupling network 26 directly to the intermediate power amplifier stage 29 via line 35.

Intermediate power amplifier 29 has a dual capability of providing audio amplification during reception and radio frequency amplification during transmission. This dual capability is achieved by the input and output coupling networks which are made to respond only to the audio and the radio frequency signals and to reject all other signals. In particular the input coupling network 27 provides separate terminals for the audio and the radio frequency signals. An output coupling network 34 provides a separate terminal for the amplified audio from where it is fed directly to the speaker 32 and through the feedback loop 33 to amplifier 28. During transmission the radio frequency signal is taken from the R.F. terminal of the coupling network 34, to the final power amplifier 36 and to the transmitting antenna. If desired antenna 11 and 37 can, of course, be utilized as a common structure, by means of suitable connections. Finally, automatic gain control can be appropriately applied to various stages and this is represented by the box identified by numeral 37.

In conjunction with the foregoing arrangement, a switching means 38 has been provided which permits either the transmitting or receiving mode to be established without the necessity of employing switching in the direct path of the signals being fed through the transceiver. Accordingly, switching means is provided with a pair of armatures 39, 41 operable when set to the right as shown in the drawing to establish a receiving mode whereby local oscillator 19 is coupled to the second frequency conversion means and local oscillator 15 is coupled to the first frequency conversion means. Switching means 38, when conditioned to the left as shown in the drawing, serves to interchange the connections whereby local oscillator 19 is connected for the transmission to the first frequency conversion means 12 and local oscillator 15 is coupled to second frequency conversion means 25. Thus, with the armatures 39, 41 positioned to a "left hand" condition (as viewed in the drawing), the low frequency oscillator is coupled to the first frequency convertor so that audio signals introduced to the input of the first convertor are heterodyned to intermediate frequency level and then by the second convertor to the frequency of transmission.

With the armatures 39, 41 conditioned for receiving, the high frequency oscillator is coupled whereby the received radio frequency signals at the input of the first convertor are heterodyned to I.F. and the amplified I.F. signals at the input of the second convertor are heterodyned to audio frequency signals.

In the following detailed description, due to the large number of reference numerals to be employed, a combination of letters and numbers has been utilized to identify the various more important components. Thus, resistors are normally preceded by the letter R, condensors by C and so forth. Various stages are identified in association with vacuum tubes referred to utilizing the letter V. Thus, one stage of the audio pre-amplifier is identified as stage V–1. Furthermore, inasmuch as a number of the components are of substantially conventional design, a full description of such components, over and above the wiring diagram and over and above the schematic circuit layout, is not considered necessary.

The transceiver is designed to operate preferably in the 2–9 mc. band as shown in the circuit diagram. The transceiver comprises a number of stages such as a microphone and audio pre-amplifier, V–1, receiver audio pre-amplifier V–10A, a power amplifier V–7 for boosting audio power during receiving and the transmitter intermediate power when transmitting, a transmitter power amplifier V–11, V–12, V–13, automatic level circuit V–8, a low frequency oscillator V–10B (the other half of V–10A) and a high frequency oscillator V–9.

Oscillator switching is performed by the switch designated generally S–1. The switch S–2 provides antenna switching AVC/ALC switching, and the supply voltage switching functions. Four separate voltages are provided: 800 volts (+B high), 350 volts (+B), 250 volts regulated (+B reg), and —60 volts bias (—C).

The microphone pre-amplifier stage V–1 is entirely conventional and needs no explanation. Radio frequency amplifier stage V–2 is also conventional, except that, when transmitting, the screen voltage of the stage is switched off by means of switch section S–2–C to prevent signal feedback problems. The designation 220–R or 220–T therefore, indicates that 220 volts will be applied only during the reception mode or transmission mode, respectively.

The stage V–3 is a beam deflection tube, such as the RCA 7360 type, and is connected to operate as a balanced modulator when the set is transmitting. A 455 kc. local oscillator V–10–B is connected to the grid of V–3 through a network as explained below. The deflection electrode (dynode) D–1 is biased to operational positive voltage through the resistive dividing network R–2 and R–3 and the amplified microphone audio signal is fed to this dynode through the coupling capacitor C–1 while the resistor R–1 provides a high impedance load for the audio signal. The other deflection electrode (dynode) D–2 is biased positively through a network R–4, R–5, and R–6 while the rest of the network is described below. The output of V–3 is fed to a mechanical filter, F.

With no audio at D–1, the resistor control R–5 can be adjusted so that the electron beam is equally divided between the plates P–1 and P–2. Since the filter input coil is connected across the plates, no current will flow through it when in a perfectly balanced condition. The audio signal on D–1 deflects the beam from the balanced position and the plate current unbalance thus created flows through the filter input coil. This current represents the two sidebands of an amplitude modulated signal with the carrier missing, i.e., a double sideband suppressed carrier signal. The filter removes one sideband and a pure single sideband signal is present at the input of the I.F. amplifier.

The 455 kc. local oscillator signal of V–10–B is connected to the control grid of V–3 through the "*t*" contact of switch section S–1–D. The secondary of RF transformer T–1 is in series with the local oscillator. During transmission V–2 is disabled by removing the screen voltage. Thus, at 455 kc. the impedance of the secondary coil of T–1 is negligible and the tuned circuit can be considered substantially a short circuit presenting no impedance to the 455 kc. local oscillator signal.

Capacitor C–2 is a conventional decoupling capacitor which maintains the "cold" side to T–1, i.e., the secondary of T–1 at R.F. ground. Capacitor C–2 is in parallel with C–4 of the 455 kc. oscillator plate load (C–5 is very large and serves decoupling purposes). The series combination of C–3, C–2, and C–4 forms a voltage divider which serves to reduce the amplitude of the local oscillator signal and at the same time decouples any impedance changes at the plate of the oscillator caused by switching from one mode to the other. The coil L–1 tunes the capacitor network approximately to 455 kc. so that a good sine wave is present on the control grid of V–3 and spurious responses due to harmonics are avoided.

Dynode D–2 is connected to R.F. ground through C–6 which is DC grounded through the "*t*" contact of the S–1–B switch section. The grounding is necessary to prevent stray couplings to dynode D–2 as explained below.

A choke CH–3 is used in receiving mode and does not affect the operational DC bias on dynode D–2. The bias is prevented from being bypassed to ground by capacitor C–6.

Therefore, in transmission mode, stage V–3 operates as a balanced modulator converting the audio signal to a single sideband signal with a suppressed carrier at 455 kc.

During reception mode R.F. amplifier V–2 receives screen voltage through switch S–2–C. The signal received and amplified appears on the control grid of V–3. The "cold" side of T–1 is grounded to R.F. via C–2 and grounded to DC through the "R" contact of the S–1–C switch section. Such grounding arrangement suppresses spurious responses as will be described. A transmit-receive switch (not shown) on the microphone can disconnect the microphone fromV–1, or if the microphone does not have such a switch, the screen voltage to V–1 can be removed (as shown) by the S–2–C relay section so that V–1 remains disabled during receiving and no audio voltage is present on dynode D–1. Dynode D–1 is also kept at R.F. ground by C–7, which has a high impedance at audio frequencies so that the audio signal is not shunted to ground during transmission.

Dynode D–2 is connected to the high frequency oscillator plate tank circuit through the "*r*" contact of the S–1–A switch section and a blocking capacitor C–8. A choke CH–3 provides a high impedance load for the oscillator while permitting a DC bias to pass to dynode D–2. The differential R.F. voltage between dynodes, D–1, D–2 switches the electron beam between plates P–1 and P–2 so that the *gm* between control grid and plate is varied at R.F. rate to provide heterodyning action.

The current passing through the input coil of the filter F includes all the components resulting from the product of the received intelligence as well as the CW local oscillator signal. In particular, it will contain the frequency sum and difference components of these signals. Because of the balanced nature of the circuit, the original control grid signal will be balanced out. This, however, is only incidental and is of no particular advantage because of the already large frequency separation between the useful and the undesired components.

The oscillator frequency is selected whereby only the difference signal component is passed via the filter.

If a single sideband signal is being received and the high frequency of the local oscillator is carefully adjusted, the filter output signal will be a replica of the received signal at I.F. level.

Some circuit simplification would result, if the received signal were connected to the dynode and the high frequency local oscillator signal to the control grid. It is, however, of advantage to secure as high a conversion gain as possible from V–3. Since the control grid *gm* is much higher than the dynode *gm*, and since the conversion gain is proportional to the signal grid *gm*, the chosen connection is much superior from a gain point of view. The gains of all circuits throughout the transceiver are optimized so that the signal level at each stage is as low as possible and problems with audio rectification and intermodulation from strong adjacent signals are thereby minimized.

To obtain high conversion gain from V–3 in transmitting mode, certain circuit modifications have been provided. The usual quadrature control, used with balanced circuits, and which adjusts the phase of the plate signals for the fine balance, is omitted. The recommended plate load of 10,000 ohms for the RCA 7360 is raised to the load presented by the filter input only. The accompanying rise in output level is reduced by the reduction of the CW signal level to prevent distortion in the filter. Reduction of the CW level has a further beneficial effect in reducing spurious responses as will be explained below.

Chokes CH–1 and CH–2 are used in the plate circuit of V–3 instead of the usual resistors so that a high plate voltage is maintained at all times. This helps to keep low the dynode currents and to reduce the nonlinear component of the dynode input impedance caused by these currents. Measurements have shown that the dynode current has a zero derivative at a level of about half the recommended dynode bias voltage. Keeping the dynode bias at the zero derivative point makes the dynode current symmetric for the positive and negative audio voltages so that the danger of carrier unbalance with audio is reduced. The high plate voltage, therefore, prevents the instantaneous plate voltage from becoming too low at times when the instantaneous dynode voltage is low which would then cause an appreciable fraction of the beam electrons to return to the screen grid, resulting in signal distortion. The inductance of the chokes CH–1 and CH–2 is tuned out with the filter tuning capacitors so that the filter input circuit remains at approximate resonance to 455 kc.

The impedance of the dynode biasing network is kept as low as possible and the resistance "seen" by each of the dynodes is made equal to still further reduce the effect of dynode currents on carrier balance. The driving impedance of V–2 is kept as low as allowed by the necessary signal amplification thereof.

With the above arrangement in effect, no degenerative circuit for stabilizing the long term carrier balance is necessary. With the supply voltages regulated, the balance remains sufficiently stable for practical purposes.

I.F. amplifier V–4 and V–5 is of conventional design and need not be described in detail. The filter is coupled to the grid of V–4 through a small capacitor C–9 and I.F. transformer T–2. The output transformer T–4 provides a balanced output. Control grids V–4 and V–5 are provided with automatic volume and level control voltages through the switch section S–2–B, described below.

A second frequency conversion means is operably coupled to receive signals from the I.F. amplifier and to convert them to R.F. when transmitting and to A.F. when receiving. In the latter instance it serves as a product detector. Thus, a stage is provided employing another beam deflection tube V–6 of the kind described above. Resistors R–8, R–9, R–10, R–11 and R–18 provide a conventional bias network for the dynodes of V–6. The resistors R–12 and R–13 serve to decouple the low impedance biasing networks from the secondary of T–4 and are of a sufficiently high impedance so as not to affect appreciably the selectivity of T–4. The bias potentials are separated by means of a blocking capacitor C–10 which has low impedance at the I.F. frequency. The capacitors C–11 ad C–12 provide a balanced R.F. ground point for T–4 and tune the secondary of T–4 to the I.F. frequency.

During the transmitting period, the high frequency local oscillator is connected to the control grid of V–6 through C–13 and the "*t*" contact of the S–1–A switch section. Resistor R–4 provides a ground return for the grid of V–6. The balanced I.F. input to dynodes D–1 and D–2 deflects the beam between plates P–1 and P–2 so that the signal on the plates consists of the product of the control grid and dynode signals. In particular, the plate signal comprises the sum and difference components in push-pull and the CW signal in parallel.

A tuned circuit, connected between the plates, is provided by a coil L–3 and capacitors C–14, C–15 and C–16, and is tuned to select either the sum or difference frequency depending on the choice of oscillator frequency. The CW signal is suppressed due to the balanced nature of the circuit. This is of great value, because the 455 kc. separation of the CW signal from the sum and difference components would otherwise make it fairly difficult to remove the oscillator signal by the action of the tuned circuit alone. The capacitors C–17 and C–18 act to block the DC plate voltage from the tuned circuit. The chokes CH4 and CH5 present a high impedance at the R.F. channel frequency and only their shunt capacitance must be taken into account since the capacitance is effectively across the tuning capacitors C–14 and C–15. The capacitors C–14 and C–15 provide a balanced R.F. ground point for the tuned circuit.

During the receiving period, the control grid of V–6 is connected to the low frequency oscillator through the "*r*" contact of the S–1–D switch section. Dynodes D–1 and D–2 of V–6 are provided with the received intelligence in balanced form from the secondary of T–4. The plate signal of V–6 contains the sum and difference components and the difference component serves as the recovered audio signal which appears in push-pull on the plates. The DC blocking capacitors C–17 and C–18 will be substantially open circuit to the audio while chokes CH–4 and CH–5 will be nearly short circuit. The audio signal is developed across the plate resistor R–15 and is taken single ended to a volume control R–17. The capacitor C–181 is an audio bypass and the capacitor C–20 is a heavy bypass to remove hum from the supply voltages. A resistor R–16 is substantially equal to R–15 to preserve a balanced circuit configuration. The capacitor C–19 together with choke CH–5, make a "*pi*" network to remove the sum component of the plate signal. A choke CH–6 and capacitor C–21 (or an RC network if desired) provides additional filtering.

Figures 2A, 4:
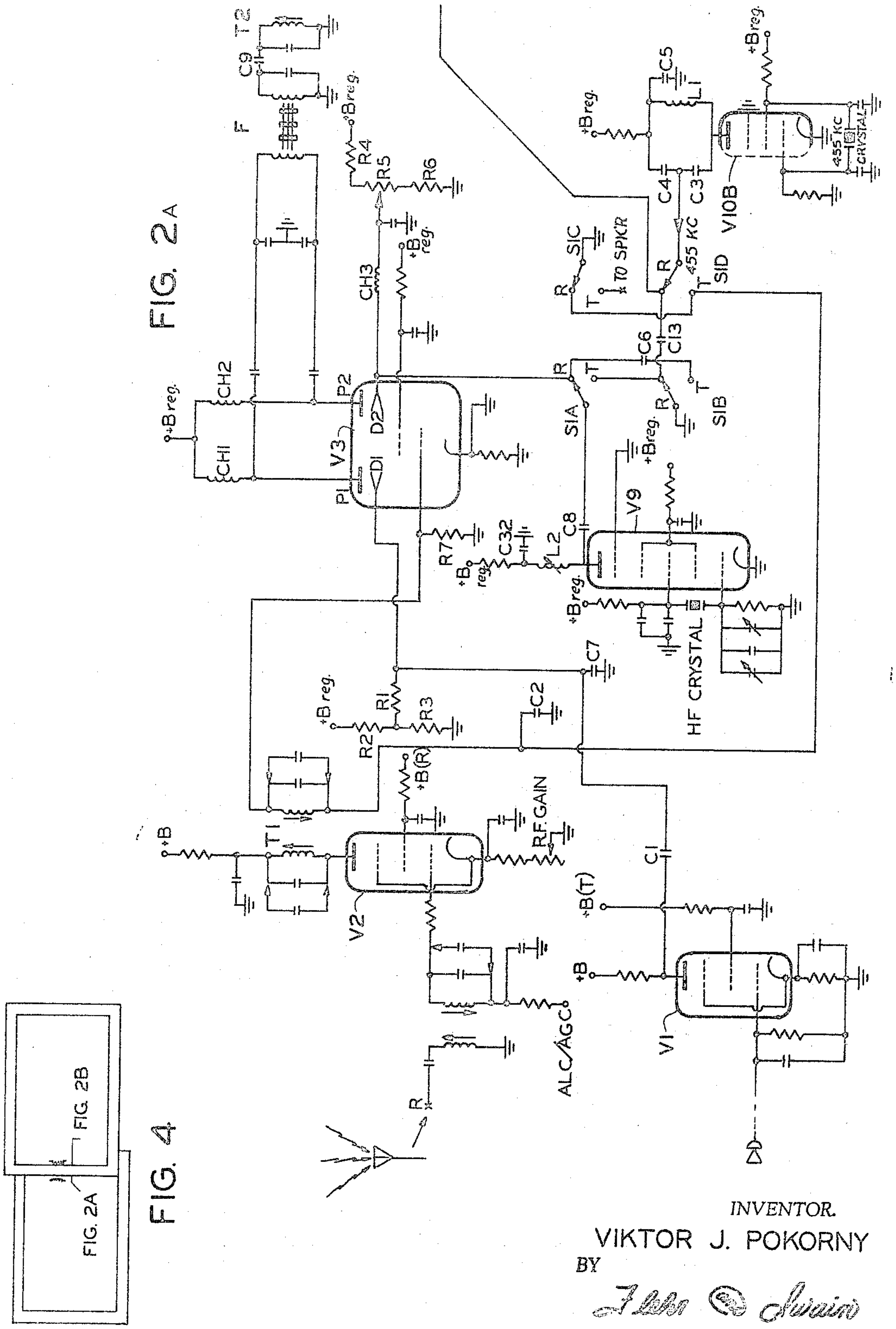
FIGURES 2A, 2B show a schematic diagram of a circuit according to the invention.
FIGURE 4 shows the arrangement of FIGURES 2A, 2B.
Figures 2B, 3:
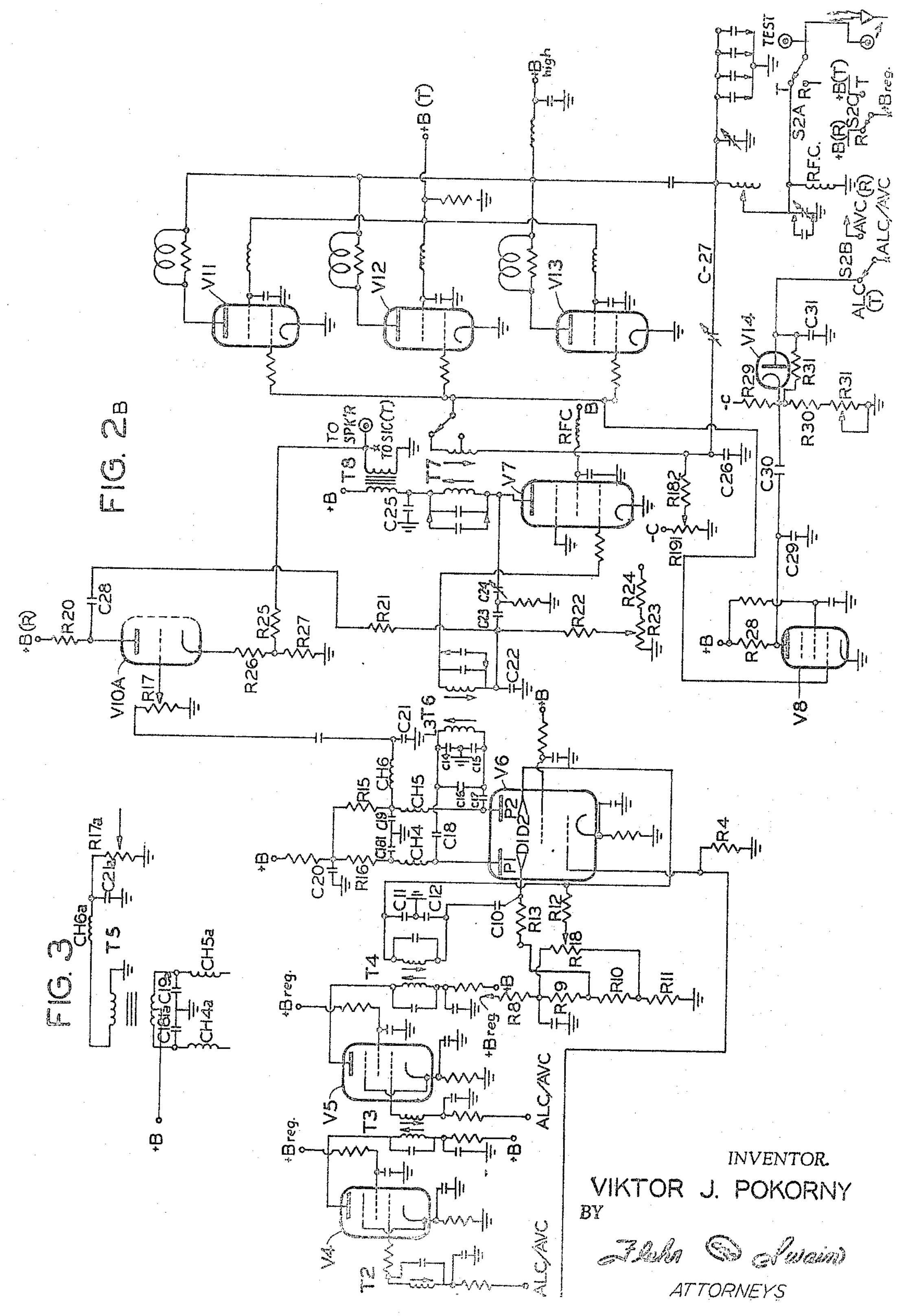
FIGURE 3 shows another embodiment of a portion of the circuit of FIGURES 2A, 2B.

According to another embodiment, the plate circuit arrangement utilizes an audio push-pull transformer T–5 (FIGURE 3). The audio is taken in push-pull from both plates of V–6 by transformer T–5. Both capacitors C–181*a* and C–19A are high impedances for audio signals and serve only as filters for the unwanted signal components. Hum reducing filter C–20 has been removed in this arrangement. The audio signal is taken from the secondary of T–5 through a filter network CH–6A and C–21*a* as before. With very large signals, some audio rectification takes place in V–6 so that, even though the local oscillator is made inoperative, some audio signal may possibly be heard in the single ended connection. Particularly if the interfering signal is amplitude modulated, clear intelligence can come through the loudspeaker even though the AM station may not be exactly "on frequency." Since the audio rectification components appear on the plates in parallel, the use of the balanced circuit T–5 makes it possible to insure their removal from the audio channel. Although balance control R–18 is not entirely necessary to V–6 for transmitting, it serves during the receiving function as a balance control to completely remove the audio rectification signals.

Stage V–7 functions as an intermediate power amplifier, IPA, in the transmitting mode and as an audio power amplifier in the receiving mode.

During transmission, the single sideband R.F. signal appears on the secondary of T–6 and is fed to the grid of V–7. The capacitor C–22 provides an R.F. ground for the secondary circuit and together with C–23 and C–24 provides neutralization for V–7 in a known circuit. T–7 provides the plate load circuit of V–7. C–25 provides R.F. ground for the primary, but remains substantially open circuit for audio signals. The secondary of T–7 is connected to the grids of an R.F. power amplifier, PA, including the tubes V–11, V–12 and V–13, arranged to operate in Class AB1 (no grid current) condition. The output circuit of the R.F. power amplifier is *pi* coupled to the antenna and is in all respects conventional. The power tubes are biased through R–182 and R–191 and the capacitors C–26 and C–27 provide neutralization to the stage.

In receiving mode, the audio signal at the tap of the volume control R–17 can be applied directly to V–7 for final amplification, if desired. It has been found, however, that superior performance results by providing additional amplification and a feedback circuit arrangement. For this purpose the audio signal is applied to the grid of V–10–A. The plate supply to V–10–A is turned off during the transmission mode by the switch section S–2–C to prevent any possibility of R.F. feedback. During reception the amplified audio signal is taken from the plate load R–20, through the blocking capacitor C–28 and through the resistor R–21 to the "cold" side of the transformer, T–6. At audio frequency, the secondary coil of transformer T–6 is substantially short circuit and the audio appears on the control grid of V–7. Resistor R–21 serves to isolate the neutralization voltage on C–22 from the plate of V–10–A. Resistor R–21 has a value much smaller than R–22 so that substantially no attenuation of the audio takes place. C–22 and C–23 are substantially open circuit to the audio signal. The high resistance of R–22, isolates neutralization voltage from the low impedance negative bias circuit R–23 and R–24 which provides the proper operating voltage for class A operation in the V–7 stage.

The primary of T–7 is substantially short circuit to audio frequency and C–25 is open circuit so that the audio signal is developed across the primary of the audio transformer T–8. The secondary of transformer T–8 is connected to the speaker jack and to the resistor network R–25, R–26 and R–27 which forms a conventional "transformer-to-first-tube-cathode" feedback. This feedback arrangement provides considerable improvement in distortion-free operation of the audio amplifier.

The speaker terminals are shorted during the transmitting mode by the "*t*" contact of the S–1–C switch section to prevent any audible noises from incidental audio rectification in V–7.

The transceiver is provided with an automatic level control circuit to prevent overload of the power amplifier grids when transmitting. The usual method for ALC uses the audio voltage pulses developed across the grid circuit impedance by the average value of grid current in the overloaded power amplifier tubes. Another common method for ALC is to attenuate and rectify plate signal of the power amplifier and to compare this voltage with a fixed reference to develop the corrective ALC voltage. In the former method, the power amplifier must start distorting before the corrective voltage can be developed. In the latter method, the peak plate voltage in the power amplifier depends on the plate loading. To prevent overload in the latter method, the peak plate voltage at which a corrective signal appears must be adjusted at the worst expected case of mismatch with heavy loading (the mismatch with light loading increases the plate voltage). This requirement appreciably reduces the available power output of the set in normal operation.

The ALC circuit employed herein obviates the above difficulties by introducing a separate control tube V–8. The control grid of V–8 is connected to the control grids of the power amplifier V–11—V–13, and since these are biased very negatively, V–8 is normally completely cut off. As the PA grid voltage approaches zero and passes the cutoff of V–8 (−5 volts for a sharp cutoff tube) sharp R.F. current spikes will be present on the plate of V–8. The R.F. component of the current will be bypassed to ground by C–29 while the average DC component develops negative voltage pulses across R–28. The pulses are rectified by V–14 or a silicon diode of high back resistance, if desired, and the peak negative pulse voltage appears across the capacitor C–31. The time constant of the ALC circuit is determined by the RC network, C–31 and R–31 and is set to around 3 seconds. The resistor network, R–29, R–30 and R–31 sets the negative DC bias for the controlled stages and the control R–31 acts as the transmitter gain control.

The DC bias voltage with the ALC control signal "riding" on top of it are fed to the controlled I.F. stages V–4; and V–5 through the ALC contact of the S–2–B switch section. The DC bias of the stage is set with R–31 so that the overall transmitter gain is such that on quiet talking into the microphone the peak PA grid voltage just reaches the cutoff of V–8. On stronger microphone signals the necessary control signal is developed on C–31 to reduce the I.F. gain of the set, and the loop gain of the control feedback system is so adjusted that even with the strongest signals enough control voltage is developed to prevent grid conduction of the power amplifier. The charging time constant of the V–8 plate circuit is sufficiently fast to provide rapid development of the control voltage. This circuit is very effective during the transmitting mode and is independent of power amplifier loading conditions. The output power of the transceiver is not appreciably reduced and the percentage reduction depends on the sharpness of cutoff and the *gm* of the V–8 tube. A gated beam tube may be used for V–8.

Electron coupled local oscillators of conventional construction are used in the transceiver. The electron coupled type appears to offer the best isolation of the output tank impedance from the frequency determining circuits. The high frequency oscillator uses a pentagrid converter tube to further improve on this isolation so that no particular attention has to be paid to providing equal loads for the oscillator on receiving and transmitting. The capacitance C–13, serving to couple the high frequency oscillator to V–6, has the same value as C–2, so that the 455 kc. oscillator sees no large load change when switched.

Final attention should be brought to the special efforts made to prevent spurious responses which could be created by the oscillator switching arrangement, especially when a strong adjacent channel signal is present. With strong signals close to the received frequency, some audio rectification in the V–3 converter stage is inevitable. It is evident that any leakage of the low frequency 455 kc. oscillator signal to the control grid of V–3 will result in a heterodyne signal which will be passed by filter F just as the microphone audio is heterodyned with the 455 kc. signal when transmitting. If no special precautions are taken, then even with the high frequency oscillator disabled, any signal strong enough to get through the input tuned circuits and cause audio rectification, will be heard in the loudspeaker.

To prevent the leakage of the 455 kc. signal through the S–1–D switch section, the "*t*" contact of this section is connected to ground through the R contact S–1–C. Any electrostatic coupling to dynode D–2 of V–3 through the stray capacitances of the switch contacts S–1–A and S–1–B is prevented by grounding the "*r*" contact of S–1–B and the "*t*" contact of S–1–A. Capacitor C–13, which is needed to couple the H.F. oscillator when transmitting, is grounded when receiving. Capacitor C–6 is floating during reception, but any electrostatic coupling to capacitor C–6 or to the associated circuit wiring finds a low impedance path to ground through C–8, L–2 and C–32. The H.F. oscillator tank is provided with a high C/L ratio to make the impedance of L–2 at 455 kc. relatively low. Finally, the level of the 455 kc. signal is kept low, as has been explained above, to reduce the danger of stray couplings and to facilitate shielding. Careful shielding is included in the mechanical layout of the set to prevent stray coupling to V–3 and also to the high impedance low level points of the I.F. amplifier, where 455 kc. stray signal would impair carrier balance.

The local oscillator plates are tuned to provide a good sine wave to prevent spurious response from this source. This is particularly important with the 455 kc. oscillator since the danger of electrostatic coupling increases with frequency.

I claim:

1. In a transceiver system having a transmitting and a receiving mode of operation and means for selectively transmitting and receiving intelligence signals, the combination comprising a first local oscillator for generating a first oscillating signal, a second local oscillator for generating a second oscillating signal, intermediate frequency signal amplifying means having input and output means, first heterodyning means operatively coupled to said input means, second heterodyning means operatively coupled to receive signals via said output means, and switching means selectively operable to couple said first oscillating signal to said first heterodyning means and said second oscillating signal to said second heterodyning means for one of said modes, and in the other mode to operatively couple said first oscillating signal to said second heterodyning means and said second oscillating signal to said first heterodyning means.

2. In a transceiver system having a transmitting and a receiving mode of operation for selectively transmitting and receiving intelligence signals, the combination comprising a first local oscillator means for generating a first oscillating signal, second local oscillator means for generating a second oscillating signal, intermediate frequency amplifying means having input and output connections serving to direct intermediate frequency signals through said amplifying means from said input to said output for both said transmitting and receiving modes, first heterodyning means having the dual capability of mixing an audio frequency input and said first oscillating signal to provide an intermediate frequency signal in said transmitting mode and also of mixing a radio frequency input and said second oscillating signal to provide an intermediate frequency signal in said receiving mode, the output of said first heterodyning means being operably coupled to the input of said intermediate frequency amplifying means, second heterodyning means having the dual capability of mixing said first oscillating signal with the output signal of said amplifying means to recover an audio frequency signal from a received signal during said receiving mode, and also of mixing said second oscillating signal with the output signal of said amplifying means to provide a signal for transmission during said transmitting mode, and switching means selectively operable between two conditions, one condition serving, during one mode, to operably couple said first local oscillator means to said first heterodyning means and said second local oscillator means to said second heterodyning means, and the other condition serving, during the other mode, to operably couple said first local oscillator means to said second heterodyning means and said second local oscillator means to said first heterodyning means whereby said first and second heterodyning means and said intermediate frequency amplifying means function in both said modes.

3. In transceiver apparatus according to claim 1 wherein said first heterodyning means has the dual capability of converting an R.F. signal to an I.F. signal and of converting an audio frequency signal to said I.F. signal, and wherein said second heterodyning means has the dual capability of converting said I.F. signal to audio frequency and said I.F. signal to radio frequency.

4. In transceiver apparatus according to claim 1 wherein said first oscillating signal is a relatively low frequency local oscillator signal and said second oscillator signal is a relatively high frequency local oscillator signal, and said first heterodyning means has a dual capability of mixing amplified audio frequency signals with said first oscillating signal during the transmission mode and, during the receiving mode mixes radio frequency signals with said second oscillating signal, and wherein said second heterodyning means has a dual capability of mixing said first oscillating signal with the output signal during said receiving mode and of mixing said second oscillating signal with the output signal of said I.F. amplifying means during said transmission mode to develop a signal to be transmitted.

5. In transceiver apparatus according to claim 1 wherein said second heterodyning means includes an output coupling network serving when in said transmitting mode to pass R.F. signals converted from I.F. signals to the exclusion of audio signals converted from I.F. signals, and serving, when in said receiving mode, to pass recovered audio signals to the exclusion of R.F. signals.

6. In a transceiver system wherein intelligence is transmitted and received, the combination including first frequency conversion means, said first frequency conversion means having a dual capability of converting an audio frequency signal upwardly to an intermediate frequency signal and converting a radio frequency signal downwardly to an intermediate frequency signal, a second frequency conversion means, said second frequency conversion means having the dual capability of converting an intermediate frequency signal upwardly to a radio frequency signal and of converting an I.F. signal downwardly to an audio frequency signal, I.F. signal amplifying means disposed between the output of said first frequency conversion means and the input of said second frequency conversion means, first local oscillator means, second local oscillator means, switching means serving, during a transmitting mode of operation to connect said first oscillating means to the input of said first frequency conversion means and to connect the input of said second local oscillator means to said second frequency conversion means, and selectively operable to serve, during a signal receiving mode of operation, to couple said first local oscillator means to said second frequency conversion means and said second local oscillator means to said first frequency conversion means.

7. For use in a transceiver apparatus according to claim 2, further including power amplifier means coupled to receive from said second heterodyning means an R.F. signal to be amplified and further transmitted, said power amplifier means including first electron valve means including a control electrode therein to receive, for amplification and transmission, said R.F. signal and automatic gain control means including an electron valve having a control electrode, bias means arranged to bias said control electrodes below cut-off whereby the peaks of said R.F. signal in the region of zero grid bias generate an automatic level control signal, said control electrodes being disposed in parallel to receive said R.F. signal from said second heterodyning means, means in the load circuit of the last named valve to pass R.F. components of said R.F. signal to ground and to develop negative going D.C. voltage pulses in said load circuit, the last named means serving to rectify said R.F. components and develop a negative going D.C. bias voltage to be applied to said I.F. amplifying means.

8. A transceiver system as defined in claim 5 wherein said first heterodyning means includes a balanced beam deflection tube having a control electrode and connected to serve during transmitting mode as a balanced modulator converting audio signals to single side band signals with carrier suppressed, coupling means serving to inductively couple said control electrode to receive amplified R.F. signals in said receiving mode, said control electrode being direct coupled to said first local oscillator in said transmitting mode, and choke means disposed to maintain high plate voltage on the plate electrodes of said balanced beam deflection tube.

9. A transceiver apparatus according to claim 5 wherein said second heterodyning means includes a balanced beam deflection tube having a pair of anodes and having a first, second and third control electrode therein, said first electrode being operatively coupled, in said transmitting mode, to said output means and said third electrode being operatively coupled, in said transmitting mode, to said first local oscillator, and said second electrode being operatively coupled in said receiving mode to said output means and said third electrode being operatively coupled in said receiving mode to said second local oscillator, said output coupling network including an audio frequency output lead inductively coupled to each of the anodes of said second heterodyning means to provide a single ended audio frequency output signal on said lead in said receiving mode, and an R.F. output means capacitively coupled in push-pull to each of said plates.

References Cited

UNITED STATES PATENTS

| | | | |
|---|---|---|---|
| 2,373,569 | 4/1945 | Kannenberg | 332—44 |
| 2,943,271 | 6/1960 | Willis | 332—43 X |
| 3,112,446 | 11/1963 | Wilson | 325—18 |
| 3,164,800 | 1/1965 | Kroenert. | |
| 3,219,931 | 11/1965 | Lennon et al. | 325—18 |

FOREIGN PATENTS

| | | | |
|---|---|---|---|
| 485,992 | 5/1938 | Great Britain. | |

JOHN W. CALDWELL, *Acting Primary Examiner.*